United States Patent
Maruki et al.

[11] Patent Number: 5,788,034
[45] Date of Patent: Aug. 4, 1998

[54] LOCKUP CLUTCH FOR A TORQUE CONVERTER AND METHOD OF THERMALLY TREATING A LOCKUP CLUTCH PISTON

[75] Inventors: Michio Maruki, Kariya; Takao Taniguchi, Okazaki; Masataka Shimazaki, Gifu; Fumitomo Yokoyama, Aichi-ken; Hideji Kato, Okazaki; Kouji Ohbayashi, Nagiya; Yoshimi Watanabe, Okazaki; Naohisa Momiyama, Hekinan; Masayoshi Imakire, Okazaki, all of Japan

[73] Assignee: Aisin AW Co., Ltd., Japan

[21] Appl. No.: 632,804

[22] Filed: Apr. 17, 1996

[30] Foreign Application Priority Data

Apr. 17, 1995 [JP] Japan ................. 7-091203

[51] Int. Cl.⁶ ............... F16H 45/02; C21D 1/06
[52] U.S. Cl. ............... 192/3.29; 192/107 M; 148/565; 148/639; 219/121.16; 219/121.17
[58] Field of Search ............... 192/3.28, 3.29, 192/3.3, 212, 107 R, 107 M; 464/66; 148/565, 639; 219/121.12, 121.16, 121.17, 121.35

[56] References Cited

U.S. PATENT DOCUMENTS

| | | | |
|---|---|---|---|
| 4,179,316 | 12/1979 | Conners et al. | 148/565 |
| 4,240,532 | 12/1980 | Blomquist | 192/3.28 |
| 4,441,594 | 4/1984 | Kubo et al. | 192/3.28 |
| 4,486,240 | 12/1984 | Sciaky | 148/565 |
| 4,646,886 | 3/1987 | Nishimura | 192/3.28 |
| 4,903,803 | 2/1990 | Koshimo | 192/3.28 |
| 5,141,474 | 8/1992 | Fujimoto et al. | 464/67 |
| 5,209,330 | 5/1993 | MacDonald | 192/3.29 |

FOREIGN PATENT DOCUMENTS 4109485   9/1992   Germany ............... 192/3.29

*Primary Examiner*—Richard M. Lorence
*Attorney, Agent, or Firm*—Lorusso & Loud

[57] ABSTRACT

A lockup clutch for torque converter which prevents engaging and disengaging shock when a transmission torque suddenly changes, includes a lockup clutch assembly, a lockup clutch piston operating the lockup clutch assembly, and a damper device disposed between the lockup clutch piston and an output member for absorbing changes of transmission torque occurring in association with the operation of the lockup clutch assembly. The lockup clutch piston is made of steel and has a thermally treated portion placed at a surface in contact with springs of the damper device wherein the thermally treated portion is hardened by rapid local melting with high density energy radiation such as electron beam followed by rapid cooling.

12 Claims, 9 Drawing Sheets

LOCKUP CLUTCH FOR A TORQUE CONVERTER AND METHOD OF THERMALLY TREATING A LOCKUP CLUTCH PISTON

BACKGROUND OF THE INVENTION

1. Field of the Invention

This invention relates to a lockup clutch for a torque converter in an automatic transmission of a vehicle.

2. Description of Related Prior Art

An automatic transmission is conventionally equipped with a torque converter which hydraulically couples the rotational output of an engine crankshaft to an input shaft of the transmission. The typical torque converter includes a pump impeller, a turbine runner, a stator, a lockup clutch assembly, and a damper device. The rotation from the engine drives the pump impeller by a direct connection through a circular converter cover which contains hydraulic fluid driven by the impeller for rotation with the cover. The turbine runner is connected to the transmission input shaft and is engaged with the rotating hydraulic fluid so as to be driven by the hydraulic fluid to transmit the rotation of the engine to the input shaft.

The lockup clutch assembly is engaged when the vehicle reaches a prescribed vehicle speed after starting driving so that the transmission input shaft is directly connected through the clutch to the converter cover to eliminate normal slippage of the fluid coupling between the impeller and turbine runner in the torque converter and thus improve gas mileage. At the instant the lockup clutch is engaged, the difference between the rotational speeds of the impeller and turbine runner causes an abrupt change of the output torque of the engine transmitted to the transmission input shaft tending to generate shock, vibrations, noises, and the like. A damper device is therefore disposed between the lockup clutch assembly and a hub mounting the turbine runner on the transmission input shaft. This damper device has springs placed along an outer circumferential portion of a piston of the lockup clutch with the springs supported on the outer peripheral side of a drive plate mounted on the piston of the lockup clutch assembly. The drive plate pushes one ends of the springs, whereas a driven plate mounted on the turbine hub is engaged by the other ends of the springs. Accordingly, when the transmission torque is suddenly transmitted to the lockup clutch assembly by the engagement of the lockup clutch, the springs flex and transmit the torque to the transmission input shaft while being flexed so as to absorb the sudden change of the torque being transmitted.

Due to repeated engagement and disengagement of the lockup clutch, the lockup clutch piston and the springs are subject to repetitive sliding motion on the clutch piston. This repetitive sliding motion subjects the surfaces of the clutch piston and the springs to wear. Friction members can be provided on the spring holders to reduce this wear. However, the provision of friction members on spring holders increases the number of parts of the torque converter and makes assembly of the torque converter more complicated. Alternatively, the surface of the lockup clutch piston can be hardened by a conventional treatment such as carbonizing or nitriding. When the surface of the lockup clutch piston is hardened by a conventional surface hardening method, such as carbonizing or nitriding, the flat portion of the lockup clutch piston is prone to deformation from strain introduced by the carbonizing or nitriding. The strain in the piston needs to be corrected, and therefore the assembly work becomes more complicated.

Another prior art surface hardening technique which could be possible applied to the steel lockup clutch piston is to heat the surface of the lockup clutch piston to a hardening temperature (austenitic temperature) by heating with an electron beam (EB) or a laser to transform ferrite-pearlite phase steel to austenite phase steel, and then to form the hard martensite phase by rapid self-cooling. However, the prior art requires that the steel surface portions being hardened be held at the hardening temperature for a period of time sufficient to transform the steel to uniform austenite. Due to the length of this austenitic transformation time, the temperature throughout a substantial thickness of the lockup clutch piston is increased by heat transfer which causes both deformation of the lockup clutch piston and improper hardening from insufficient self-cooling. A deformed lockup clutch piston cannot smoothly engage and disengage the front cover thereby further contributing to engaging and disengaging shocks.

SUMMARY OF THE INVENTION

It is an object of the present invention to provide a torque converter with an improved and more durable lockup clutch with a damper device capable of eliminating engaging and disengaging shock.

The foregoing object is accomplished with a torque converter including a lockup clutch assembly disposed between a front cover and an output member, a lockup clutch piston operating the lockup clutch assembly, and a damper device disposed between the lockup clutch piston and the output member for absorbing changes of transmission torque occurring in association with the operation of the lockup clutch assembly. The lockup clutch piston is made of steel and arranged with a thermally treated portion placed at a surface in contact with a spring of the damper device, and the thermally treated portion is hardened by local melting and cooling.

Because the hardening is performed by local melting and cooling, the temperature is not substantially increased by heat transfer in a wide region of the piston around the thermally treated portion so that the heat accumulated in the lockup clutch piston is reduced to improve the self-cooling effect for hardening and to prevent the lockup clutch piston from losing dimensional accuracy due to deformation. The improved self cooling effect allows the thickness of the lockup clutch piston to be thinner with respect to the depth of the hardened layer. Various plastic workings such as riveting by plastic deformation can be implemented because portions outside the thermally treated portion remain malleable and are not hardened.

The thermally treated portion can include a first thermally treated region placed on a flat portion of the lockup clutch piston, and a second thermally treated region placed on a flange of the lockup clutch piston. Since the temperature does not substantially increase by heat transfer in regions of the piston outside the thermally treated regions, the thermally treated regions do not thermally interfere with one another such as by tempering or annealing one another. The plural thermally treated regions can be simultaneously melted and hardened, so that the heat-treatment time can be shortened.

The lockup clutch piston retains the spring by directly contacting the spring with the thermally treated portion located on the outmost circumference of the piston. The thermally treated portion decreases susceptibility of the piston from being worn out due to sliding of the spring.

A drive plate of the damper device is secured to the lockup clutch piston by riveting with plastic deformation and retains the spring against the thermally treated portion. Riveting by plastic deformation can be implemented at any portion outside the thermally treated portion because the hardening temperature increase and cooling is limited to the thermally treated portion of the piston. Thus assembling is simplified along with reduction in cost and number of parts.

A friction member is disposed on a surface of the lockup clutch piston in opposition to the front cover, and a thermally treated portion is placed in proximity on the opposite side of the piston from the friction member. The friction member can have extremely flat surfaces because the surface of the piston is not distorted by heat deformation to avoid engaging or disengaging shock caused by distorted friction members.

BRIEF DESCRIPTION OF THE DRAWINGS

The above and other objects and features of the invention are apparent to those skilled in the art from the following description of the preferred embodiments when considered in conjunction with the accompanied drawings, in which.

DETAILED DESCRIPTION OF PREFERRED EMBODIMENTS

Figure 1:
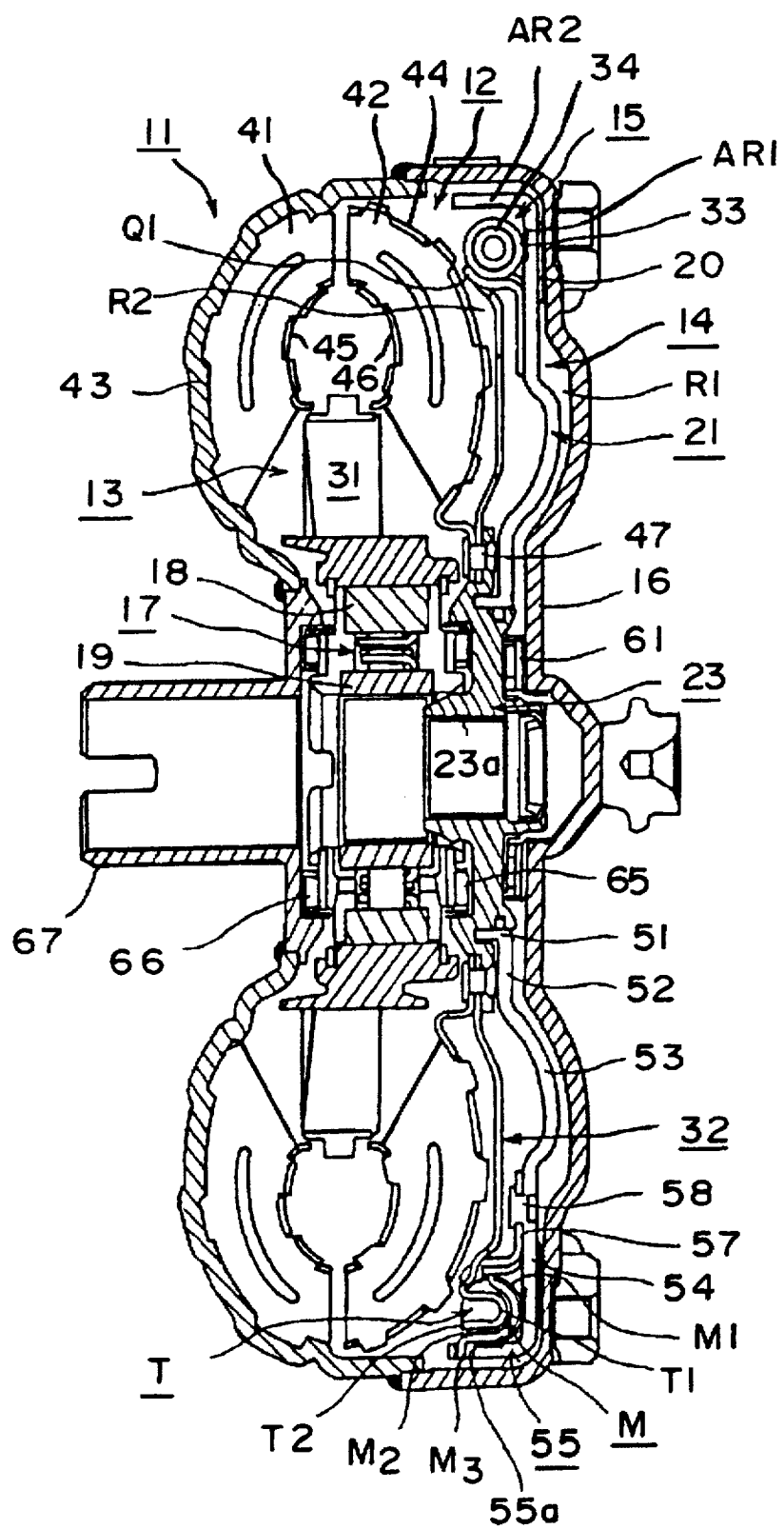
FIG. 1 is a vertical cross section of a torque converter according to a first embodiment of the invention.
Figure 2:
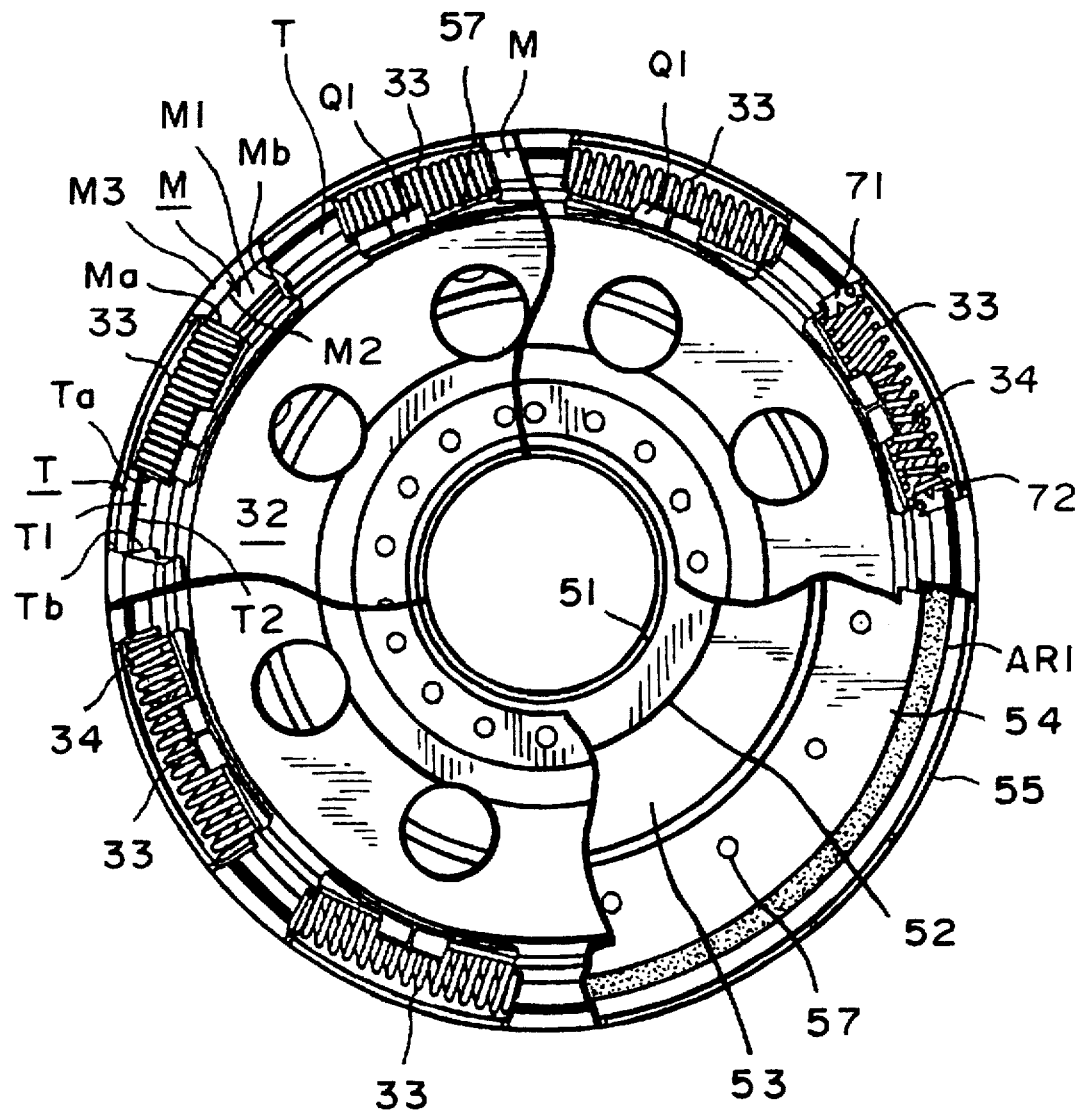
FIG. 2 is a plan view with portions broken away of the torque converter in FIG. 1.

Referring to FIGS. 1 and 2, a torque converter 1 in accordance with a first embodiment of the invention includes a pump impeller 11, a turbine runner 12 forming a torus with the pump impeller 11, a stator 13, a lockup clutch assembly 14, and a damper device 15. Rotation of an engine from a crankshaft (not shown) is transmitted through a front cover 16 connected to the crankshaft to the pump impeller 11 fixed in the front cover 16. When the pump impeller 11 rotates, oil or hydraulic fluid is distributed by centrifugal force in the torus and rotates with the cover and impeller 11 around an axis while circulating among the pump impeller 11, the turbine runner 12, and the stator 13.

When the pump impeller 11 starts rotating and has a large rotary speed differential from the turbine runner 12, e.g. when the vehicle starts driving, the oil flow out of the turbine runner 12 flows in a direction opposing the rotation of the pump impeller 11. The stator 13 is therefore disposed between the pump impeller 11 and the turbine runner 12 and changes the oil flow to a direction supporting the rotation of the pump impeller 11 when the rotary speed differential between the pump impeller 11 and the turbine runner 12 is large. When the turbine runner 12 increases in rotational speed to render the rotary speed differential between the turbine runner 12 and the pump impeller 11 small, the oil flow previously impinging on the front side of stator blades 31 now pushes the rear side of the blades 31, thereby tending to disturb the oil flow. A one-way clutch 17 disposed on a radially inner side of the stator 13 renders the stator 13 rotatable in a fixed direction so that when the oil flow pushes the rear side of the blades 31, the stator 13 rotates with the oil flow permitting the oil to circulate smoothly. An outer race 18 of the one-way clutch 17 is secured to the stator 13; an inner race 19 of the one-way clutch 17 is secured to a casing of the automatic transmission (not shown). The torque converter thus amplifies the torque by operating as a torque converter when the rotary speed differential between the pump impeller 11 and the turbine runner 12 is large and operates as a fluid coupling when the rotary speed differential is small.

A lockup clutch assembly 14 is engaged when the vehicle reaches a prescribed speed. When the lockup clutch is engaged, the rotation of the engine is transmitted directly to the input shaft of the transmission mechanism bypassing the torque converter to increase the gas mileage of the vehicle. The lockup clutch assembly 14 operates by switching oil supply by a lockup relay valve (not shown). By moving in the axial direction, the lockup clutch piston 21 engages with and disengages from the front cover 16. A releasing oil chamber R1 is disposed between the lockup clutch piston 21 and the front cover 16, and an engaging oil chamber R2 is disposed between the lockup clutch piston 21 and the turbine runner 12. When oil is fed to the releasing oil chamber R1, the lockup clutch assembly 14 is disengaged; when oil is fed to the engaging oil chamber R2, the lockup clutch assembly 14 is engaged. When the lockup clutch piston 21 engages the front cover 16 via a friction member 20, the rotation of the crankshaft is directly transmitted to the transmission input shaft (not shown) through the front cover 16, the lockup clutch piston 21, the damper device 15, and a turbine hub 23 serving as an output member. A spline 23a is formed on a radially inner surface of the turbine hub 23 for connecting the turbine hub 23 to the transmission input shaft. The numeral 61 represents a thrust bearing disposed between the turbine hub 23 and the front cover 16; the numeral 65 represents a thrust bearing disposed between the stator 13 and the turbine hub; the numeral 66 represents a thrust bearing disposed between the stator 13 and a sleeve 67.

The damper device 15 absorbs changes in torque to the transmission occurring when the lockup clutch piston 21 and the front cover 16 are engaged with and disengaged from each other. The damper device 15 includes drive plates 57 secured to the lockup clutch piston 21 by rivets 58 formed as raised projection parts of the piston 21 to form a head which is hammered so that the plate 57 rotates with the lockup clutch piston 21, a driven plate 32 disposed in the opposition to the drive plate 57 and mounted on the hub 23 to rotate unitedly with the turbine runner 12, and springs 33, 34. The springs 33 form a first stage arranged at eight positions circumferentially disposed on the lockup clutch piston 21; the springs 34 form a second stage arranged at four positions circumferentially disposed on the lockup clutch piston 21; the springs 34 are placed inside every other spring 33. The spring 34 has a smaller diameter and is shorter than the spring 33; a helix angle of the spring 33 represents a predetermined set value; the spring 34 starts to be flexible after the transmission torque reaches the value of the bending point torque. Rotation is transmitted from the front cover 16 through the friction member 20, the clutch piston 21 and the damper device 15 to the turbine hub 23. The springs 33, 34 are compressed by relative rotation between the plates 32 and 57 to absorb changes in the transmission torque. The springs 33, 34 also suppress vibration and noise caused by sudden changes of the output torque of the engine to the transmission mechanism.

The pump impeller 11 and the turbine runner 12 have blades 41, 42, with outer shells 43, 44, and inner shells 45, 46 disposed on both sides of the blades 41, 42, respectively. The outer shell 44 of the turbine runner 12 along with the driven plate 32 is connected to the turbine hub 23 by rivets 47.

The lockup clutch piston 21 includes a first or inner flange 51 extending in the axial direction and slidably mounted on the turbine hub 23, a first flat plate portion 52 extending radially outward from the first flange 51, a curved portion 53 extending radially outward from the first flat plate portion 52, a second flat plate portion 54 extending radially outward from the curved portion 53, and a second or outer flange 55 extending axially from the second flat plate portion 54. The curved portion 53 projects from the first and second flat plate portions 52, 54 toward the engine. The second flat plate portion 54 and the second flange 55 form front and outer sides of holders of the springs 33. Since the springs 33 are placed at the outmost circumference of the lockup clutch piston 21, the space in the outer portion of the front cover 16 between the front cover and the torus is efficiently utilized and the diameter of the springs 33 can be relatively large. Accordingly, the springs 33 can have a small spring constant, and as a result, eigenfrequency can be smaller.

To hold the springs 33, 34 and to transmit the rotation of the lockup clutch piston 21 to the springs 33, 34, arcuate drive plates 57 are mounted at eight circumferentially disposed positions on the lockup clutch piston 21. The arcuate drive plates 57 are secured to the lockup clutch piston 21 by rivets 58 formed by bosses or plastically formed projections of the piston with hammered heads. Each drive plate 57 has curved flange portions Q1 at its opposite ends extending axially and spaced radially inward from the second flange 55 to engage central portions of the springs 33 opposite to the second flange 55. Ends of the curved portions Q1 extend radially outward over the springs 33 opposite to the second flat plate portion 54 of the clutch piston 21 to thus form with the plate portion 54 and second flange 55 spring retainers surrounding the circumferences of the springs 33. At the center of each drive plate 57, a spring end engaging or pushing portion M is formed to extend between the ends of adjacent springs 33 so as, while the lockup clutch assembly 14 is engaged, to engage the end of one spring when the lockup clutch piston 21 rotates relative to driven plate 32 in a normal direction (the counterclockwise direction in FIG. 2; hereinafter referred as to "during the normal drive") and to engage the end of the other spring when the lockup clutch piston 21 rotates relative to the driven plate 32 in a reverse direction (the clockwise direction in FIG. 2; hereinafter referred as to "during the reverse drive") such as during engine braking. The spring pushing portion M pushes the end face of the spring 33 by a pushing face Ma during the normal drive and by a pushing face Mb during the reverse drive. The spring pushing portion M includes a curved portion M1 extending along the end face of the spring 33, a riser portion M2 rising along the second flange 55, and an engagement portion M3 engaging an engagement groove 55a formed on the second flange 55.

The driven plate 32 extends radially along the turbine runner 12 and has engagement portions T formed to extend between the ends of each adjacent pair of springs 33 and to move freely relative to the pushing portions M of the drive plates 57 along a circular path about the rotative axis. The engagement portions T engage the ends of the springs 33 opposite to the pushing portions M of the drive plates 57 during the normal and reverse drives of the lockup clutch piston 21. The engagement portion T pushes the spring 33 by a pushing face Ta during the normal drive and by a pushing face Tb during the reverse drive, respectively. The engagement portion T is disposed substantially parallel to the spring pushing portion M and includes a curved portion T1 extending substantially parallel to the curved portion M1 along the end face of the spring 33, and a riser portion T2 rising parallel to the riser portion M2 along the second flange 55.

It is to be noted that both end faces of the springs 33, 34 are subject to pushing by the spring pushing portion M and the engagement portion T and prone to wear. Therefore, spring sheets 71, 72 are arranged on both ends of the springs 33, 34. The spring pushing portion M is formed with the curved portion M1, and the engagement portion T is formed with the curved portion T1, so that areas to contact the spring sheets 71, 72 are widened. Accordingly, the spring pushing portion M, the engagement portion T, and the spring sheets 71, 72 can improve wear resistance. Each spring 33 is, during the normal drive of the lockup clutch piston 21, pushed on one end by the spring pushing portion M and held at the other end by the engagement portion T. As the spring 33 is compressed, the distance between the spring pushing portion M and the engagement portion T is shortened, and if the pushing face Ta of the engagement portion T hits the curved portion Q1, the compression of the spring 33 is stopped. Thus, the curved portion Q1 serves as a stopper of the engagement portion T.

Meanwhile, since the springs 33 are compressed by different pushing portions M and different engagement portions T during the normal and reverse drive of the lockup clutch piston 21, the springs 33 frictionally slide repetitively on the second flat plate portion 54. To prevent the second flat plate portion 54 from being worn down due to frictional sliding with the springs 33, an annular first thermally treated region AR1, as a part of a thermally treated portion of the lockup clutch piston, covering the area of engagement of the second flat plate portion 54 with the springs 33 is melted and hardened by high density energy radiation, for example, such as electron beam radiation (EB melting-hardening). The springs 33 are forced into engagement with the second flange 55 by the centrifugal force produced by rotation of the lockup clutch piston 21. During the normal and reverse drives of the lockup clutch piston 21, the springs 33 frictionally slide on the second flange 55 repetitively. To prevent the second flange 55 from being worn down due to frictional sliding with the springs 33, an annular second thermally treated region AR2, as another part of the thermally treated portion of the lockup clutch piston, covering the area of engagement of the second flange 55 with the springs 33 is also melted and hardened.

Figure 3:
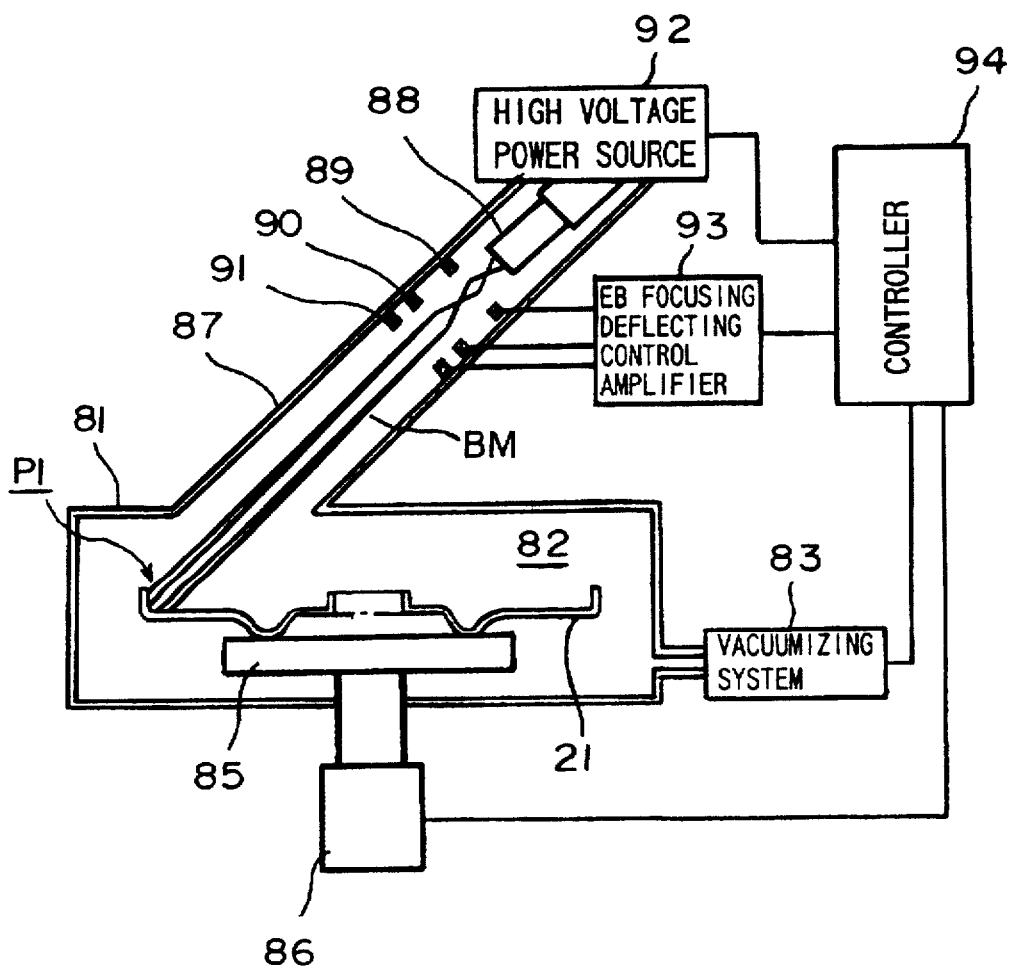
FIG. 3 is a diagrammatic sectional illustration of a melting and hardening apparatus suitable for hardening surface portions of a clutch piston of the torque converter of FIG. 1.

In the melting and hardening apparatus of FIG. 3, the numeral 81 represents a vacuum working chamber casing having a sealing structure; the numeral 82 represents a vacuum working chamber surrounded by the vacuum working chamber casing; and the numeral 83 is a vacuum system for forming a vacuum in the vacuum working chamber 82. In the vacuum working chamber 82, a rotary table 85 is rotated by a motor 86 mounted outside the vacuum working chamber casing 81. A lockup clutch piston 21 is put coaxially on the rotary table 85. A beam pipe 87 is connected to the vacuum working chamber casing 81. An electron beam gun 88 is attached to one end of the beam pipe 87. A first focusing lens 89 for focusing electron beam BM generated by the electron beam gun 88 is mounted on an downstream side of the electron beam gun 88; a second focusing lens 90 for further focusing the electron beam BM is mounted on a downstream side of the first focusing lens; a deflector 91 for deflecting and scanning the electron beam BM is formed on a downstream side of the second focusing lens 90. A high voltage power source 92 is connected to the electron beam gun 88; the first and second focusing lens 89, 90 and the deflector 91 are connected to an EB focusing deflecting control amplifier 93; a controller 94 is provided to control the vacuum system 83, the high voltage power source 92, and the EB focusing deflecting control amplifier 93.

Figure 4:
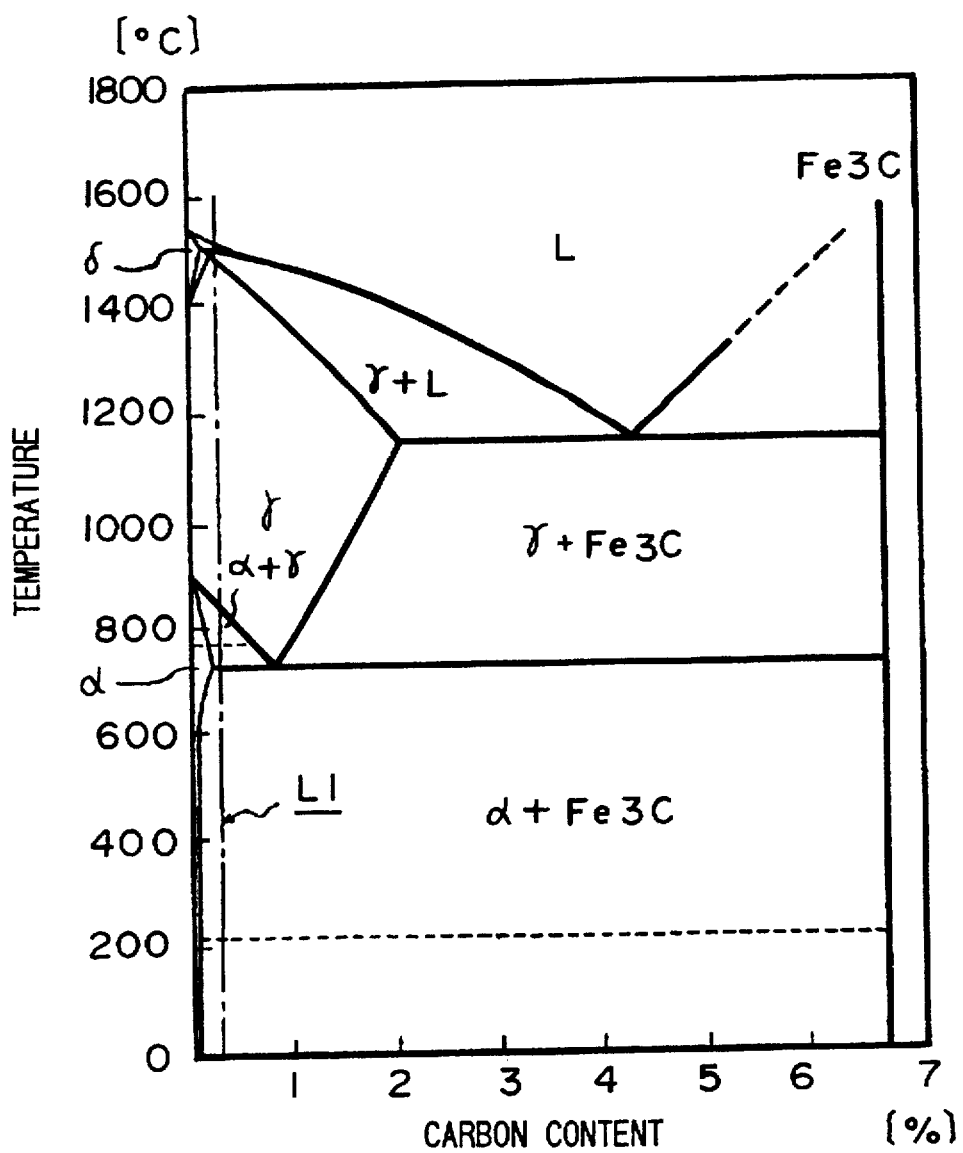
FIG. 4 is a phase diagram of a steel and carbon system.
Figure 5:
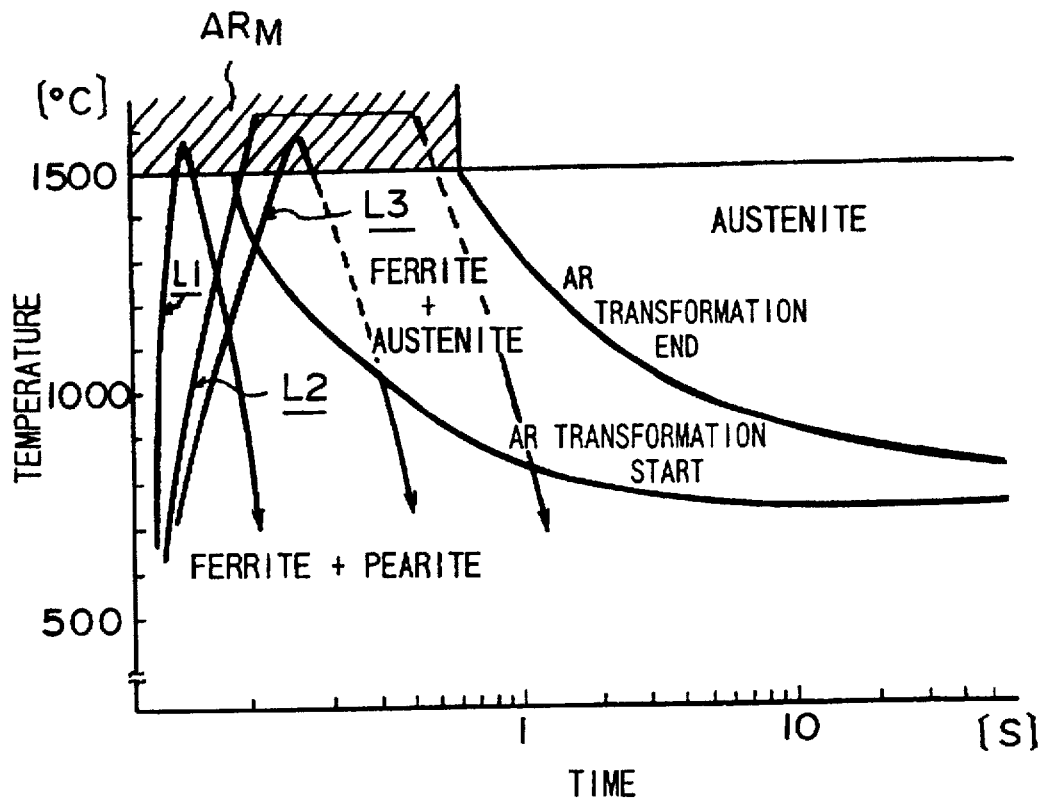
FIG. 5 is a T.T.A. curve diagram for carbon steel.
Figure 6:
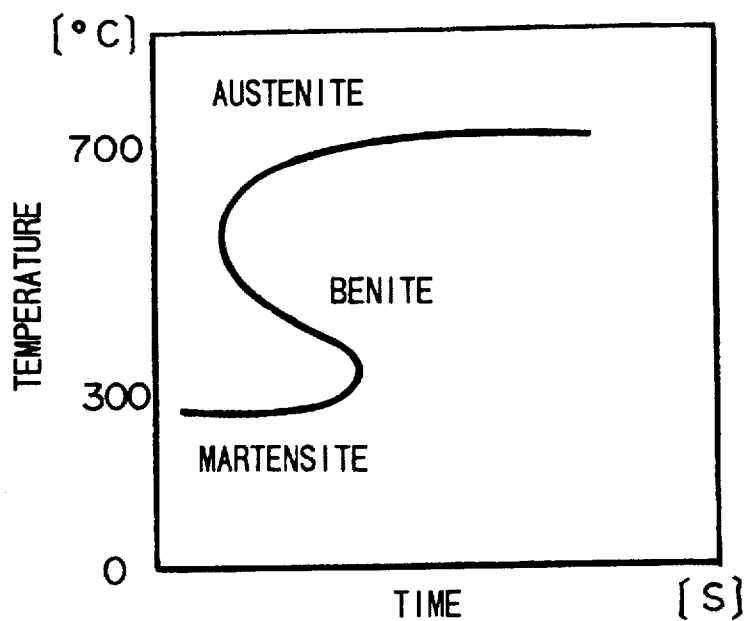
FIG. 6 is a T.T.T. curve diagram for carbon steel.

A melting and hardening method is described as follows with reference to FIGS. 4 to 6. It is to be noted that in FIG. 4, the abscissa indicates carbon content; the ordinate indicates temperature; α is a zone for pearlite; γ is a zone for austenite; L is a zone for molten phase; L1 indicates a line for crystalline organization change by melting-hardening. In FIGS. 5, 6, the abscissa indicates time, and the ordinate indicates temperature.

In the present embodiment, the lockup clutch piston 21 as a member to be thermally treated (see, FIG. 3) is made of steel, for example, carbon steel with low carbon content (low carbon steel); the thermally treated portion P1 of the lockup clutch piston 21 is heated to a melting temperature of 1500° C. or above for being melted and then hardened by self-cooling. The crystalline organization of the thermally treated portion P1 is changed along Line L1 during heating; ferrite-pearlite is heated until molten and subsequently becomes austenite when solidified. After becoming austenite, the steel becomes martensite by hardening through self-cooling. Accordingly, the surface hardness of the thermally treated portion P1 is increased, thereby improving the wear resistance.

Conventional prior art EB hardening is conducted on thermally treated members at temperatures below melting and requires a relatively long austenitic transformation time, as apparent from FIG. 5, for transforming the crystalline organization of the thermally treated portion into austenite even though the austenitic transformation time period comes to be shorter with higher temperatures. Melting requires additional heating and no crystalline structures exist in molten steel. However in the hardened surface portion of the present steel clutch piston, thermally treated portion P1 is rapidly melted followed immediately by rapid cooling to harden the surface portion. The material in the thermally treated portion P1 is heated at a temperature of 1500° C. or above for a period of time less than an austenitic transformation time period for carbon steel at a temperature immediately below the melting point. It has been discovered that the austenitic crystalline organization of the thermally treated portion P1 is immediately formed upon solidification of the molten steel. That is, in FIG. 5, the material of the thermally treated portion P1 is heated and melted as in zone $AR_M$ indicated by hatching, and then immediately subject to hardening through self-cooling. Any method of melting in 0.05 seconds or less as shown by Line L1 and then hardening, melting in 0.5 seconds as shown by Line L3 and then hardening, or melting and then hardening after the melting state is maintained for a time less than 1 second as shown by line L2 can be performed. It is to be noted that it is preferred that melting be conducted within the shortest possible time period, for example 0.05 second, followed immediately by cooling to harden the processed material.

Since the temperature of the steel adjacent the thermally treated portion P1 is prevented from substantially increasing due to the short period for heat transfer, the heat amount accumulated in the adjacent portions of the lockup clutch piston 21 is reduced to enable effective self-cooling. Consequently, the lockup clutch piston 21 can have a thinner thickness in comparison with the depth of the hardened layer. For example, the lockup clutch piston 21 may have a thickness of about one half of the required thickness for conventional EB hardening. Since the thermally treated portion P1 of the lockup clutch piston 21 is self-cooled within a relatively short period of time to the martensitic transformation temperature or below, no crystalline organization of bainite or the like is formed in the thermally treated portion P1. Consequently, no defective hardening occurs. Since the hardened layer is very thin, the surface of the thermally treated portion P1 is free from corrugating or forming a wavy surface. Moreover, since the material of the thermally treated portion P1 is solidified after melting, the surface roughness of the thermally treated portion PI is improved. Since the temperature does not increase in any significant wide region of the lockup clutch piston 21 due to heat transfer, the lockup clutch piston 21 is not subject to distortion by heat deformation. With the face of the lockup clutch piston 21 on the piston side opposite to hardened surface AR1 not being subject to heat deformation, the front face of the flat plate portion 54 mounting the friction member 20 can be reliably manufactured with an extremely flat and dimensionally stable surface. Because of this dimensionally stable flat surface, the lockup clutch assembly 14 can be assured of smooth engagement. Moreover, the carbon content in the steel making the piston 21 is extremely small, so that martensitic organization of a lesser amount may be formed after melting and hardening. The coefficient of thermal expansion of the lockup clutch piston 21 can as a result be made smaller, thereby preventing cracking from occurring during hardening. The portions of the clutch piston outside of the thermally treated portion P1 are not hardened and remain malleable, so that various plastic workings such as riveting by plastic deformation can be readily implemented in the lockup clutch piston 21. In the present embodiment, riveting with a rivet 58, such as a raised or boss portion of the piston 21, can be performed by hammering the head of the raised portion of the lockup clutch piston 21. Therefore, riveting can be done without using a separate rivet, so that the work can be simplified and the cost can be reduced.

Figure 8:
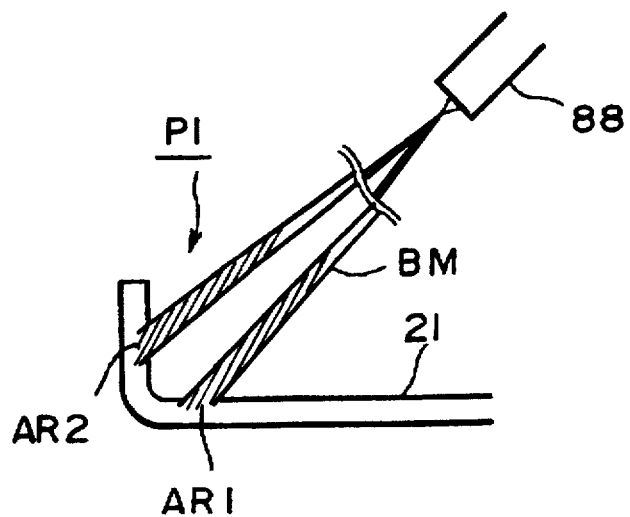
FIG. 8 is a diagram showing radiation of an electron beam in the apparatus of FIG. 3.
Figure 9:
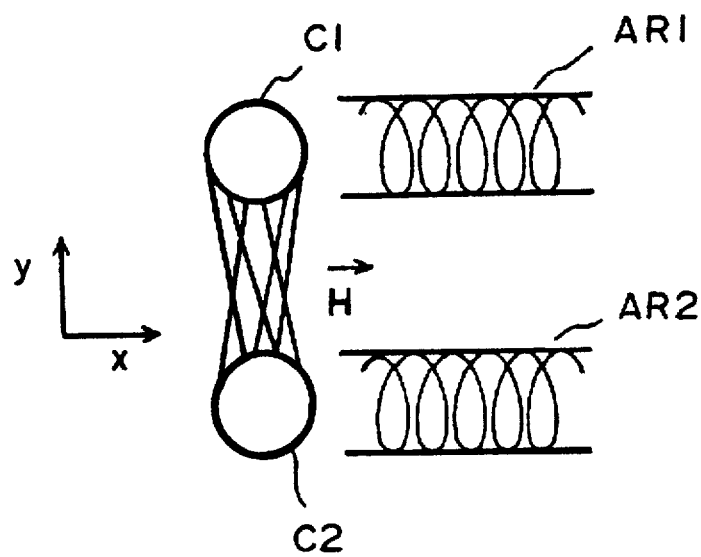
FIG. 9 is a diagram of electron beam deflection or scanning in the apparatus of FIG. 3.
Figure 10:
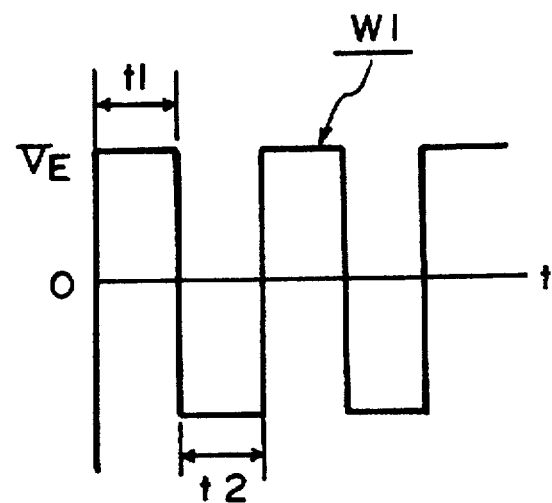
FIG. 10 is a diagram of a region switching deflection waveform in the apparatus of FIG. 3.

Referring to FIGS. 7 to 10, the melting and hardening process; by use of the electron beam EB is described in detail. In FIG. 10, the abscissa indicates time, and the ordinate indicates voltage VE of the deflection waveform. In the melting and hardening process, the electron beam BM generated at the electron beam gun 88 (see, FIG. 3) is radiated to the thermally treated portion P1 on the lockup clutch piston 21. The electron beam BM can be deflected by the deflector 91 to selectively direct the beam to different points. By rapidly alternating the beam radiation between different regions, plural places on the piston can be treated at one time.

Figure 7:
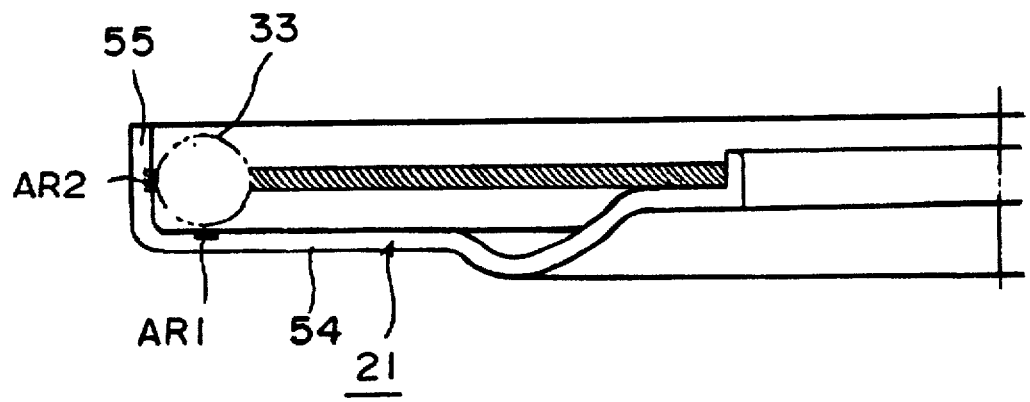
FIG. 7 is a sectional view of a portion of a clutch piston of the torque converter of FIG. 1.

In FIG. 7, the numeral 21 represents a lockup clutch piston; the numeral 33 represents a spring; the numeral 54 represents a second flat plate portion on which a first thermally treated region AR1 is located; the numeral 55 represents a second flange on which a second thermally treated region AR2 is located. These thermally treated regions AR1, AR2 extend along the entire circumference of the lockup clutch piston 21.

As shown in FIG. 8, the electron beam BM from the electron beam gun 88 can melt and harden at the same time the thermally treated regions AR1, AR2 by radiating the electron beam BM alternately on the thermally treated regions AR1, AR2 through deflection of the electron beam BM using the deflector 91. Also as shown in FIG. 9, the electron beam BM can be scanned along two circular deflection patterns or traces C1, C2. The thermally treated regions AR1, AR2 are irradiated with the electron beam BM alternately scanning the circular traces C1, C2, respectively, while the rotary table 85 is rotated. The traces of the electron beam BM therefore travel in the direction of arrow H in the thermally treated regions AR1, AR2. The respective circular traces C1, C2 are formed by sinusoidal deflection waveforms in x-axial and y-axial directions. To radiate the electron beam BM alternately on the thermally treated regions AR1, AR2 by switching between the circular traces C1, C2, a deflection waveform W1 as shown in FIG. 10 is generated and superimposed on the deflection waveform in the y-axial direction. The electron beam BM is radiated on the thermally treated region AR1 during time t1 that the voltage VE is a plus value and on the thermally treated region AR2 during time t2 that the voltage VE is a minus value.

Since the temperature does not substantially increase in regions outside the surface portions AR1, AR2 in the lockup clutch piston 21 due to heat transfer, there is no thermal interference between the thermally treated region AR1, AR2, to avoid tempering, annealing and the like of hardened surface portions. Furthermore, the electron beam BM melts and hardens the thermally treated regions AR1, AR2 at the same time, so that thermal treating time is reduced. The second flange 55 requires a higher wear resistance than the second flat plate portion 54 because centrifugal force on the springs 33 increases the friction forces between the springs 33 and the second flange 55 but does not increase the friction forces between the springs and the second flat plate portion 54. By setting the time t1 of the deflection waveform W1 shorter and the time t2 of the deflection waveform W1 longer, the thermally treated region AR1 is softer than the thermally treated region AR2. Also the energy consumption for melting and hardening can be reduced, and the working time can be reduced.

Figure 11:
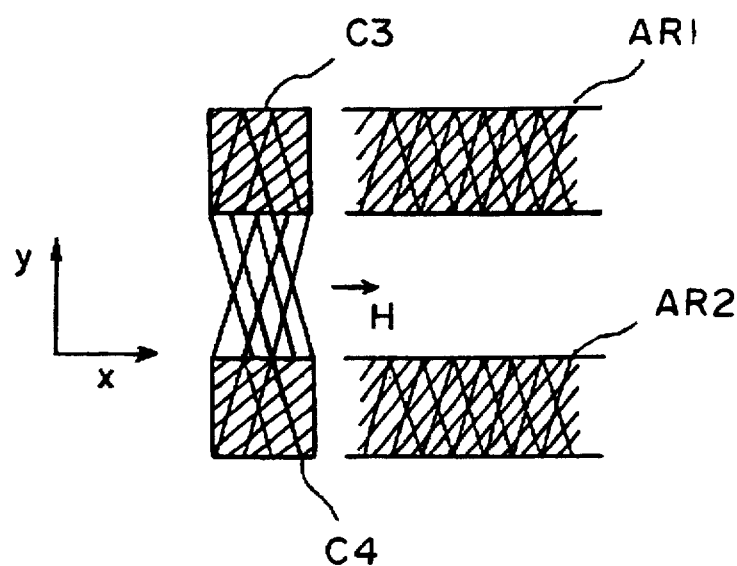
FIG. 11 is a diagram similar to FIG. 9 but of an alternative electron beam deflection or scanning.
Figure 12:
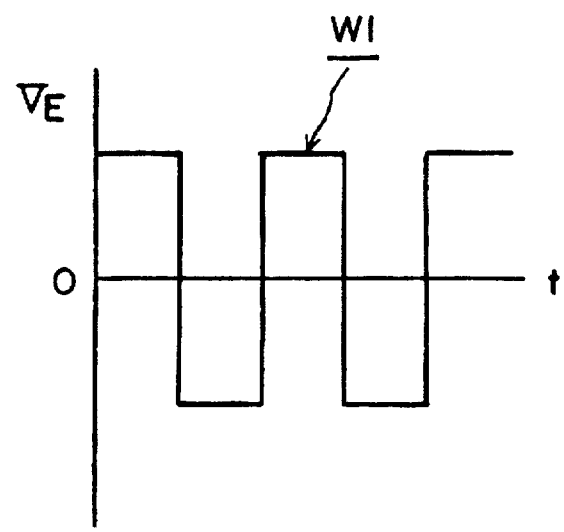
FIG. 12 is a diagram similar to FIG. 10 but of an alternative region switching deflection waveform for use with the scanning of FIG. 11.

In a second embodiment shown in FIGS. 11 and 12, modified deflection waveforms for scanning the electron beam are illustrated. It is to be noted that in FIG. 12, the abscissa indicates time, and the ordinate indicates voltage VE of the deflection waveform. As shown in FIG. 11, the electron beam BM (see, FIG. 8) is scanned along two linear or sawtooth deflection patterns or traces C3, C4. The thermally treated regions AR1, AR2 are irradiated with the electron beam BM scanning the traces C3, C4, respectively, while the rotary table 85 is rotated. The traces of the electron beam BM therefore traces in the direction of the arrow H in the thermally treated regions AR1, AR2. The respective traces C3, C4 are formed by generating sawtooth deflection waveforms in x-axial and y-axial directions. To radiate the electron beam BM alternately on the thermally treated regions AR1, AR2 by switching between the traces C1, C2, a deflection waveform W1 as shown in FIG. 12 is superimposed on the waveform in the y-axial direction.

Although the above discloses circular, linear or sawtooth waveforms producing scanning of the electron beam on processing surfaces, various other deflection waveforms including ellipses, wavy lines, complex patterns, etc. can be used.

Figure 13:
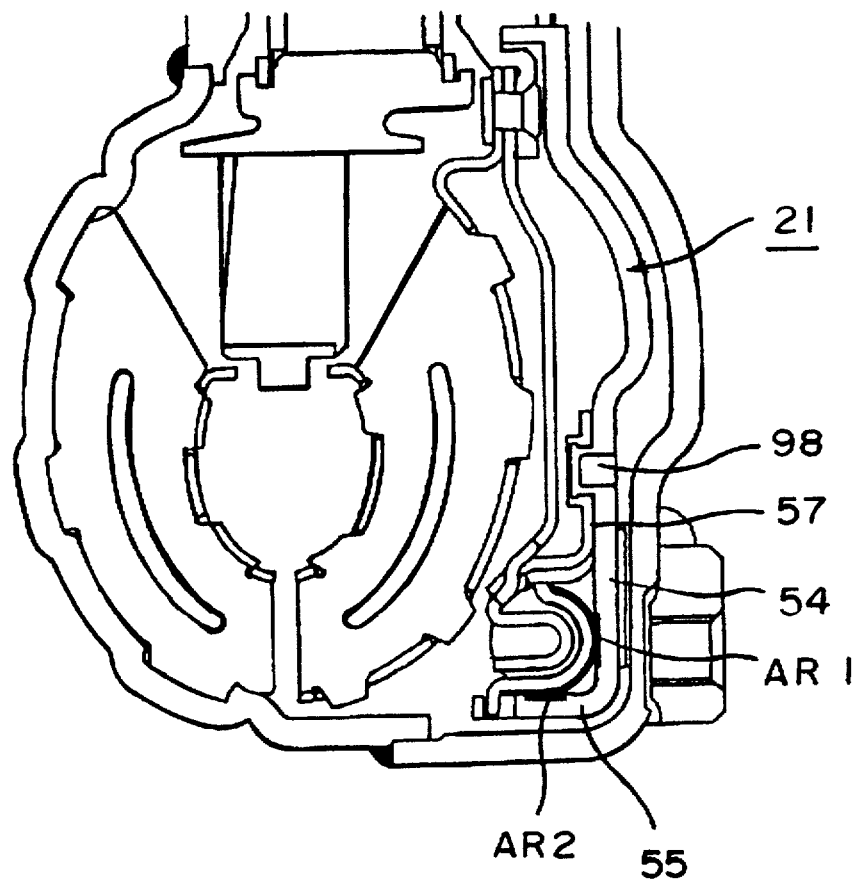
FIG. 13 is a vertical cross-section of a further modification of the torque converter of FIG. 1.

Referring to FIG. 13 showing a third embodiment, the numeral 21 represents a lockup clutch piston; the numeral 54 represents a second flat plate portion; the numeral 55 represents a second flange; the numeral 57 represents a drive plate; and the numerals AR1, AR2 represent thermally treated regions. The numeral 98 is a rivet formed by plastically deformed rivet connection method known under the trademark TOX. The drive plate 57 is secured to the lockup clutch piston 21 by the rivet 98.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not to be limited by the specification, but be defined by the claims set forth below.

What is claimed is:

1. A lockup clutch for a torque converter which includes a driven front cover and an output member, comprising:

a lockup clutch assembly disposed between the front cover and the output member;

a lockup clutch piston made of steel for operating the lockup clutch assembly; and a damper device having a spring disposed between the lockup clutch piston and the output member for absorbing changes in transmission torque occurring in association with the operation of the lockup clutch assembly;

said lockup clutch piston including a thermally treated surface portion hardened by local melting and cooling and positioned for sliding contact with the spring, wherein said local melting is by successively heating areas within said surface portion at a melting temperature above the melting point of the steel, each of said areas being heated for a period of time less than the time required for austenitic transformation of the steel when said transformation is effected at a temperature immediately below the melting Point, said period of time being immediately followed by cooling.

2. The lockup clutch for a torque converter as set forth in claim 1, wherein the thermally treated portion includes a first thermally treated region positioned on a flat portion of the lockup clutch piston, and a second thermally treated region positioned on a flange of the lockup clutch piston.

3. The lockup clutch for a torque converter as set forth in claim 1, wherein the thermally treated portion is located at an outmost circumference of the lockup clutch piston, and the lockup clutch piston retains the spring by directly contacting the spring with the thermally treated portion.

4. The lockup clutch for a torque converter as set forth in claim 3, including a drive plate secured to the lockup clutch piston by a rivet formed by a plastically deformed projection of the lockup clutch piston, said drive plate retaining the spring against the thermally treated portion.

5. The lockup clutch for a torque converter as set forth in claim 1, further comprising a friction member located on a surface of the lockup clutch piston in opposition to the front cover, wherein the thermally treated portion is positioned in proximity on the opposite side of the lockup clutch piston from the friction member.

6. The lockup clutch for a torque converter as set forth in claim 2, wherein the thermally treated portion is located at an outmost circumference of the lockup clutch piston, and the lockup clutch piston retains the spring by directly contacting the spring with the thermally treated portion.

7. The lockup clutch for a torque converter as set forth in claim 6, including a drive plate secured to the lockup clutch piston by a rivet formed by a plastically deformed projection of the lockup clutch piston, said drive plate retaining the spring against the thermally treated portion.

8. The lockup clutch or torque converter as set forth in claim 1 wherein said melting temperature is at least 1500° C. and wherein said period of time is 0.05 seconds or less.

9. A method for thermally treating a surface portion of a piston of a lockup clutch for a torque converter, said surface portion being in sliding contact with a spring member when assembled in the lockup clutch, said thermal treatment comprising:

melting areas within the surface portion by heating the areas in succession to a melting temperature above the melting point of the steel for a period of time less than the time required for austenitic transformation of the steel when said transformation is effected at a temperature immediately below the melting point; and immediately cooling each of said areas, in succession, at the end of said period of time.

10. The method as set forth in claim 8 wherein said melting temperature is at least 1500° C. and wherein said period of time is 0.05 seconds or less.

11. The method as set forth in claim 9 wherein said heating is by means of an electron gun, said gun impinging the steel piston with a trace defining each of said areas.

12. The method as set forth in claim 9 wherein said cooling is self-cooling.

* * * * *